United States Patent [19]
Ohkami

[11] Patent Number: 5,600,810
[45] Date of Patent: Feb. 4, 1997

[54] SCALEABLE VERY LONG INSTRUCTION WORD PROCESSOR WITH PARALLELISM MATCHING

[75] Inventor: Takahide Ohkami, Newton, Mass.

[73] Assignee: Mitsubishi Electric Information Technology Center America, Inc., Cambridge, Mass.

[21] Appl. No.: 352,927

[22] Filed: Dec. 9, 1994

[51] Int. Cl.⁶ .......................................................... G06F 9/45
[52] U.S. Cl. ............................................ 395/567; 395/800
[58] Field of Search ........................ 364/DIG. 1 MS File, 364/DIG. 2 MS File; 395/375, 700, 800

[56] References Cited

U.S. PATENT DOCUMENTS 5,347,639  9/1994  Rechtschaffen et al. ............... 395/375
5,408,658  4/1995  Rechtschaffen et al. ............... 395/650
5,502,826  3/1996  Vassiliadis et al. ..................... 395/375

*Primary Examiner*—Robert B. Harrell
*Attorney, Agent, or Firm*—Robert K. Tendler, Esq.

[57] ABSTRACT

A system is provided to increase the efficiency of a VLIW, Very Long Instruction Word, processor which matches its level of parallelism, LOP, to the LOP of the executable code before executing the code's fixed-length VLIW instructions, so that object-level code compatibility is kept for different processor implementations of the same VLIW architecture required for different applications. Matching is accomplished either by reducing the LOP of the processor via inactivating the processor's functional units, or by effectively reducing the LOP of the executable code via the processor executing the sequential portions of each VLIW instruction in the code, with the length of the portions equal to or less than the number of operations that the processor can handle as a VLIW instruction.

11 Claims, 21 Drawing Sheets

```
/* a program fragment */ int     i, j, j1, j2, j3, sn, n, wx, sx;
float   pr, pi, qr, qi;
float   *dr, *di, *wr, *wi;

:
            :

for ( i =0 ; i < ns; i++ )
{
    sx = n >> i;
    for ( j = 0; j < n; j++ )
    {
        j1 = j * 2;
        pr = dr[j1];
        pi = di[j1];
        j2 = j1 + 1;
        qr = dr[j2];
        qi = di[j2];
        wx = ( j / sx ) * sx;
        tr = wr[wx];
        ti = wi[wx];
        qwr = qr * tr - qi * ti;
        qwi = qr * ti + qi * tr;
        ppr = pr + qwr;
        ppi = pi + qwi;
        qqr = pr - qwr;
        qqi = pi - qwi;
        dr[j] = ppr;
        di[j] = ppi;
        j3 = n + j;
        dr[j3] = qqr;
        dr[j3] = qqi;
```

Fig. 3A

```
(01) loop1    cmp         #1, #ns
(02)          brc:ge      loop1x
(03)          sar         #sx, #n, #i
(04) loop2    cmp         #j, #n
(05)          brc:ge      loop2x
(06)          sal         #j1, #j, 3
(07)          add         #apr, #adr, #j1
(08)          ld          #pr, #pr, #apr
(09)          add         #api, #adi, #j1
(10)          ld          #pi, #api
(11)          addi #j2, #j1, 4
(12)          add         #aqr, #adr, #j2
(13)          ld          #qr, #aqr
(14)          add         #aqi, #adi, #j2
(15)          ld          #qi, #aqi
(16)          div         #wx, #j, #sx
(17)          mul         #wx, #wx, #sx
(18)          sal         #wx, #wx, 2
(19)          add         #atr, #awr, #wx
(20)          ld          #tr, #atr
(21)          add         #ati, #awi, #wx
(22)          ld          #ti, #ati
(23)          fmul #qwr1, #qr, #tr
(24)          fmul #qwr2, #qi, #ti
(25)          fsub #qwr, #qwr1, #qwr2
(26)          fmul #qwi1, #qr, #ti
(27)          fmul #qwi2, #qi, #tr
(28)          fadd #qwi, #qwi1, #qwi2
(29)          fadd #ppr. #pr, #qwr
(30)          fadd #ppi, #pi, #qwi
(31)          fsub #qqr, #pr,#qwr
(32)          fsub #qqi, #pi, #qwi
(33)          sal         #j0, #j, 2
(34)          add         #appr, #adr, #j0
(35)          st          #appr, #ppr
(36)          add         #appi, #adi, #j0
(37)          st          #appi, #ppi
(38)          add         #j3, #n, #j
(39)          sal         #j3, #j3, 2
(40)          add         #aqqr, #adr, #j3
(41)          st          #aqqr, #qqr
(42)          add         #aqqi, #adi, #j3
(43)          st          #aqqi,#qqi
(44)          addi #j, #j, 1
(45)          br          loop2
(46) loop2x   movi #j, 0
(47)          addi #i, #i, 1
(48)          br          loop1
(49) loop1x   nop
```

Fig. 3B

| Block | Op | Type | Depend |
|---|---|---|---|
| B-1 | 01 | Int | - |
|  | 02 | Sqc | last |
| B-2 | 03 | Int | last |
| B-3 | 04 | Int | 03 |
|  | 05 | Sqc | last |
| B-4 | 06 | Int | - |
|  | 07 | Int | 06 |
|  | 08 | Mem | 07 |
|  | 09 | Int | 06 |
|  | 10 | Mem | 09 |
|  | 11 | Int | 06 |
|  | 12 | Int | 11 |
|  | 13 | Mem | 12 |
|  | 14 | Int | 11 |
|  | 15 | Mem | 14 |
|  | 16 | Int | - |
|  | 17 | Int | 16 |
|  | 18 | Int | 17 |
|  | 19 | Int | 18 |
|  | 20 | Mem | 19 |
|  | 21 | Int | 18 |
|  | 22 | Mem | 21 |
|  | 23 | Flt | 13, 20 |
|  | 24 | Flt | 15, 22 |
|  | 25 | Flt | 23, 24 |
|  | 26 | Flt | 13, 22 |
|  | 27 | Flt | 15, 20 |
|  | 28 | Flt | 26, 27 |
|  | 29 | Flt | 08, 25 |
|  | 30 | Flt | 10, 28 |
|  | 31 | Flt | 08, 25 |
|  | 32 | Flt | 10, 28 |
|  | 33 | Int | - |
|  | 34 | Int | 33 |
|  | 35 | Mem | 29, 34 |
|  | 36 | Int | 33 |
|  | 37 | Mem | 30, 36 |
|  | 38 | Int | - |
|  | 39 | Int | 38 |
|  | 40 | Int | 39 |
|  | 41 | Mem | 31, 40 |
|  | 42 | Int | 39 |
|  | 43 | Mem | 32, 42 |
|  | 44 | Int | 06, 33, 38 |
|  | 45 | Sqc | last |
| B5 | 46 | Int | - |
|  | 47 | Int | - |
|  | 48 | Sqc | last |
| B-6 | 49 | Int | - |

Int: INTEGER INSTRUCTION
Flt: FLOATING-POINT INSTRUCTION
Sqc: SEQUENCE CONTROL INSTRUCTION
Mem: MEMORY INSTRUCTION

Fig. 3C

```
Int  (Integer Instructions)
nop               no operation
cmp   r1, r2      compare rs1 and rs2 and set condition code
add   r1, r2, r3  add r2 and r3 and store result in r1
addi  r1, r2, i3  add r2 and i3 and store result in r1
mul   r1, r2, r3  multiply r2 and r3 and store result in r1
div   r1, r2, r3  divide r2 by r3 and store result in r1
sar   r1, r2, r3/i3  shift right r2 by r3/i3 and store result in r1
sal   r1, r2, r3/i3  shift left r2 by r3/i3 and store result in r1

Flt  (Floating-Point Instructions)
fadd  r1, r2, r3  add r2 and r3 and store result in r1
fsub  r1, r2, r3  subtract r3 from r2 and store result in r1
fmul  r1, r2, r3  multiply r2 and r3 and store result in r1

Mem  (Memory Instructions)
ld    r1, r2      load data at r2 into r1
st    r1, r2      store data in r1 to r2

Sqc  (Sequence Control Instructions)
br    adr         branch to adr
brc:c adr         branch to adr if c is true
```

Fig. 4

|      | f0  | f1  | f2  | f3  | f4  | f5  | f6  | f7  |
|------|-----|-----|-----|-----|-----|-----|-----|-----|
|      | IU  | IU  | IU  | FPU | FPU | MU  | MU  | BU  |
|      | --- | --- | --- | --- | --- | --- | --- | --- |
| (01) | 01  | -   | -   | -   | -   | -   | -   | -   |
| (02) | -   | -   | -   | -   | -   | -   | -   | 02  |
| (03) | 03  | -   | -   | -   | -   | -   | -   | -   |
| (04) | 04  | -   | -   | -   | -   | -   | -   | -   |
| (05) | -   | -   | -   | -   | -   | -   | -   | 05  |
| (06) | 06  | 16  | 33  | -   | -   | -   | -   | -   |
| (07) | 17  | 11  | 07  | -   | -   | -   | -   | -   |
| (08) | 18  | 12  | 14  | -   | -   | 08  | -   | -   |
| (09) | 19  | 21  | 09  | -   | -   | 13  | 15  | -   |
| (10) | 34  | 36  | 38  | -   | -   | 20  | 22  | -   |
| (11) | 39  | 44  | -   | 23  | 24  | 10  | -   | -   |
| (12) | 40  | 42  | -   | 26  | 27  | -   | -   | -   |
| (13) | -   | -   | -   | 25  | 28  | -   | -   | -   |
| (14) | -   | -   | -   | 29  | 30  | -   | -   | -   |
| (15) | -   | -   | -   | 31  | 32  | 35  | 37  | -   |
| (16) | -   | -   | -   | -   | -   | 41  | 43  | 45  |
| (17) | 46  | 47  | -   | -   | -   | -   | -   | 48  |
| (18) | 49  | -   | -   | -   | -   | -   | -   | -   |

Fig. 5

|      | f0 | f1 | f2 | f3 |
|------|----|----|----|----|
| (01) | 01 | -  | -  | -  |
| (02) | 02 | -  | -  | -  |
| (03) | 03 | -  | -  | -  |
| (04) | 04 | -  | -  | -  |
| (05) | 05 | -  | -  | -  |
| (06) | 06 | 16 | 33 | 38 |
| (07) | 07 | 09 | 11 | 17 |
| (08) | 12 | 14 | 18 | 39 |
| (09) | 13 | 15 | 19 | 21 |
| (10) | 08 | 10 | 20 | 22 |
| (11) | 23 | 24 | 26 | 27 |
| (12) | 25 | 28 | 34 | 36 |
| (13) | 29 | 30 | 40 | 42 |
| (14) | 31 | 32 | 44 | 35 |
| (15) | 37 | 41 | 43 | 45 |
| (16) | 46 | 47 | 48 | -  |
| (17) | 49 | -  | -  | -  |

Fig. 15

SCALEABLE VERY LONG INSTRUCTION WORD PROCESSOR WITH PARALLELISM MATCHING

FIELD OF INVENTION

This invention relates to a class of parallel processors called VLIW, Very Long Instruction Word, processors and more particularly to the control of parallel operations, each dictated by a field of the machine instruction.

BACKGROUND OF THE INVENTION

VLIW, Very Long Instruction Word, processors are a class of parallel processors that perform multiple operations synchronously by executing very long instruction words, each of which consists of multiple fields, and each for one operation. One of the major problems with VLIW processing occurs when the executable code has a corresponding instruction set which cannot be handled by the VLIW processor. The reason that the instruction set cannot be handled is that oftentimes the executable code is compiled by a VLIW compiler which is incompatible with the specific VLIW processor employed to do the task. This happens when the executable code has been previously compiled for a different VLIW processor. Thus, problems with compatibility between executable code and VLIW processors happen most often in the case of operating system libraries, utility libraries and frequently used application programs which have been previously compiled.

By way of example, editing utilities commonly used for every type of processing are usually compiled without regard to the specific processor on which the editing utility is to be run. For instance, a typical VLIW processor may have a parallel operations capability of 4 or 8. This means that the VLIW processor can process 4 or 8 instructions in parallel. However, the compiled executable code may require parallel processing of 6 or 12 instructions. It will be appreciated that there is no necessary match between the capability of the VLIW processor and the requirements of the executable code. There is therefore a need to accommodate such a mismatch.

By way of background, VLIW processors are contrasted with other classes of parallel processors, among which SIMD, Single Instruction Stream—Multiple Data Streams, and MIMD, Multiple Instruction Streams—Multiple Data Streams, classes are well known. In an SIMD processor, an instruction is broadcast to all the processing units, which perform the same operation specified by the instruction in parallel in a synchronous manner. In an MIMD processor, the constituent CPUs, or Central Processing Units which autonomously execute instructions, perform operations in parallel in a synchronous manner.

VLIW processors provide more flexible parallel processing than SIMD processors because they can perform different operations on different data in parallel and more efficient synchronous parallel processing than MIMD processors because operations that can be performed in parallel are encoded in very long instruction words.

Unlike conventional processors, whose instructions encode one operation, VLIW processors execute very long instruction words, each containing several operation fields. Instructions for VLIW processors are produced by a VLIW compiler, which reads a program written in a high-level programming language like C, translates high-level constructs into primitive operations supported by the processor, checks the dependency of operations to find operations that can be performed in parallel, and encodes operations into VLIW instructions. If the compiler cannot find many parallel operations to fill up a VLIW instruction, it has to encode NOP, e.g., no operation, in some of its fields.

The number of NOP fields greatly affects the efficiency of the VLIW processor as well as the size of executable code. Although programs that are abundant in parallelism are compiled into compact executable codes containing a small number of NOP fields, programs that are not abundant in parallelism are compiled into large executable codes containing a large number of NOP fields. Note that bode efficiency is also affected significantly by the compiler's capability to detect parallelism in programs.

The fields of the VLIW instructions correspond to the functional units implemented in the VLIW processor. The functional units are not necessarily of the same kind. For example, integer units and floating-point units are different in operation. Once a VLIW processor is implemented with a certain number of functional units, it is very difficult to change their number and their functionality later to follow advances in computer and semiconductor technologies. Any changes to the number and functionality of functional units require the complete recompilation of all the programs, clearly a disadvantage.

Since the VLIW instruction format directly reflects the internal structure of the VLIW processor in terms of functional units, it is very difficult and very inefficient, if possible, to use the same VLIW instruction set for VLIW processors which have different structures. Thus, it is almost impossible to keep object-level code compatibility among different VLIW processor implementations, which may be required for different applications. Thus, the conventional VLIW processor architecture is not scalable.

The following lists the problems with the conventional VLIW processors. First, a VLIW processor can not efficiently support a wide range of programs which differ in the amount of parallelism. Second, the VLIW compiler tends to be large and very complicated because it has to use sophisticated but time-consuming techniques to produce the quality code which contains a small number of NOP fields in the VLIW instructions. Third, any changes to the functional units in the VLIW processor cause the complete recompilation of all the programs. Finally, it is very difficult and inefficient, if possible, to use the same VLIW instruction set for different VLIW processor implementations.

SUMMARY OF THE INVENTION

In order to overcome the disadvantages of the conventional VLIW processors, the present invention comprises a new scalable VLIW processor architecture which allows different processor implementations in terms of functional units. Specifically, the subject system compares the level of parallelism of the VLIW processor with the level of the executable code and adjusts the levels of parallelism of the two to match.

In one aspect of the present invention, the level of parallelism, or LOP, which is equal to the number of operations that are mutually independent and can be performed in parallel, is defined for VLIW processors and compiled executable codes consisting of fixed-length VLIW instructions. A VLIW processor of the present invention matches its LOP against the LOP of the executable code before actually executing the VLIW instructions of the code. If the LOP of the executable code is less than the LOP of the VLIW processor, then the processor merely inactivates its functional units so that the LOP of the remaining functional units matches that of the executable code. On the other hand, if the LOP of the executable code is greater than the LOP of the VLIW processor, then the executable code is executed by the VLIW processor by dividing up the executable code instructions into segments which can be handled by the VLIW processor. Thereafter, these instructions are executed sequentially. The result is that the LOP of the VLIW processor is matched to the LOP of the executable code.

The VLIW instruction defined as part of the VLIW architecture consists of N operation fields, each containing one fixed-length unit instruction, which is one of the traditional instructions used in conventional sequential, i.e., non-parallel, processors, such as arithmetic and logic instructions, or one of the special instructions newly defined for the VLIW architecture.

The VLIW instructions with N operation fields are called N-long instructions. A set of N-long instructions is called an N-long instruction set. Each operation field specifies one of the unit instructions, each performing one operation. The N unit instructions contained in an N-long instruction do not have any mutual dependency in terms of resource accesses, e.g., register and memory accesses, so that they can be executed in parallel. This is guaranteed by the VLIW compiler.

A VLIW processor that can execute an N-long instruction set is said to have LOP=N. That is, the processor can execute in parallel N operations specified by the N unit instructions in the N-long instruction. The VLIW processor with LOP=N has N functional units, each executing one unit instruction specified by one operation field of the N-long instruction. Each of the N functional units operates like an independent CPU or Central Processing Unit in a conventional sequential processor, except that all the N functional units share one instruction fetch block, one sequence control block, one register file block, and one memory control block.

The level of parallelism is also defined for the compiled executable code. An executable code with LOP=N can be executed by executing sequences of N unit instructions as N-long instructions. When the VLIW compiler compiles a program into an executable code with LOP=N, it guarantees that the N unit instructions in any sequence that are fetched as an N-long instruction have no mutual dependency in terms of resource accesses so that they can be executed in parallel.

In one embodiment, one instruction called the LOP instruction is defined to indicate the level of parallelism of the executable code. When it is executed in a VLIW processor, the processor's parallelism matching mechanism adjusts its level of parallelism with the code's level of parallelism LOP by changing the processor's LOP.

By way of example, if the processor's LOP is L and the code's LOP is M. If L=M, then no special action is taken since the processor is ready to execute M-long instructions with its M functional units. If L>M, then the processor reduces its LOP to match against the LOP of the code by inactivating L-M functional units to execute M-long instructions with M functional units.

If L<M, then the processor does not change its LOP but sets its execution mode to a special mode called the insufficient LOP mode in which the processor executes Q L-long instructions and one R-long instruction in sequence to complete the execution of an M-long instruction, where M=L×Q+R with Q>0 and 0≦R<L. Before the processor executes the last R-long instruction, it reduces its LOP to R by inactivating L-R functional units and restores the original LOP, L, after finishing the R-long instruction for the next M-long instruction. This way of executing an M-long instruction causes no problems, because any subsequent L or R unit instructions in an M-long instruction can be executed in parallel. This is because the M unit instructions in the M-long instruction do not have any mutual dependency. Nor does the L or R unit instructions contained in the instruction.

The above-mentioned general case may require a complicated instruction execution mechanism. In order to simplify the execution mechanism, the processor's LOP, L, and the execution code's LOP, M, are chosen as powers of 2, that is, L, M=1, 2, 4, 8, . . . Then, for L<M, M=L×Q+R, where R=0. That is, the processor executes Q L-long instructions in sequence to complete an M-long instruction. This scheme essentially eliminates the insufficient LOP mode and substitutes a special action in the instruction execution. This is possible since a sequence of M-long instructions in the executable code can be simply interpreted as a sequence of L-long instructions with Q L-long instructions per M-long instruction without requiring any special actions.

Thus, with the level of parallelism embedded in the LOP instruction and the parallelism matching mechanism in a VLIW processor, an executable code can be executed in different VLIW processors with different levels of parallelism. Conversely, different executable codes with different levels of parallelism can be executed in a VLIW processor.

In summary, a system is provided to increase the efficiency of a VLIW processor which matches its level of parallelism to the LOP of the executable code before executing the code's fixed-length VLIW instructions. This permits object-level code compatibility to be kept for different processor implementations of the same VLIW architecture required for different applications. Matching is accomplished either by reducing the LOP of the processor via inactivating the processor's functional units, or by effectively reducing the LOP of the executable code via the processor executing the sequential portions of each VLIW instruction in the code, with the length of the portions equal to or less than the number of operations that the processor can handle as a VLIW instruction. In one embodiment, the LOP is measured in the number of operations, each specified by a fixed-length unit instruction, encoded in a VLIW instruction that have no mutual dependency and can be performed in parallel. In this embodiment, the LOP of the VLIW processor is defined to be the length of the VLIW instruction equal to the number of unit instructions included in the instruction that the processor can execute. The LOP of the executable code is defined to be the number of unit instructions grouped as a VLIW instruction that was produced by a VLIW compiler for a VLIW processor. Thus, since all the unit instructions composing a VLIW instruction in the executable code are mutually independent and executable in parallel, and since any subsequent unit instructions in a VLIW instruction are also executable in parallel, it is possible for the VLIW processor to read only portions of each VLIW instruction in the executable code in sequence when the LOP of the VLIW processor is less than the LOP of the executable code.

BRIEF DESCRIPTION OF THE DRAWINGS

These and other features of the Subject Invention will be better understood taken in conjunction with the Detailed Description, taken in conjunction with the Drawings of which:

FIG. 3A is a program listing in C of a program to be compiled for a conventional VLIW processor for a simplified fast fourier transform algorithm;

FIG. 3B is a listing of the compiled code for the program of FIG. 3A;

FIG. 3C is a listing of the type and dependency of each compiled instruction for the program of FIG. 3A;

FIG. 4 is a listing annotating the instructions used in FIG. 3B;

FIG. 5 is a listing of VLIW instructions obtained by packing compiled instructions of FIG. 3B into VLIW instructions;

DETAILED DESCRIPTION

Figure 1A:
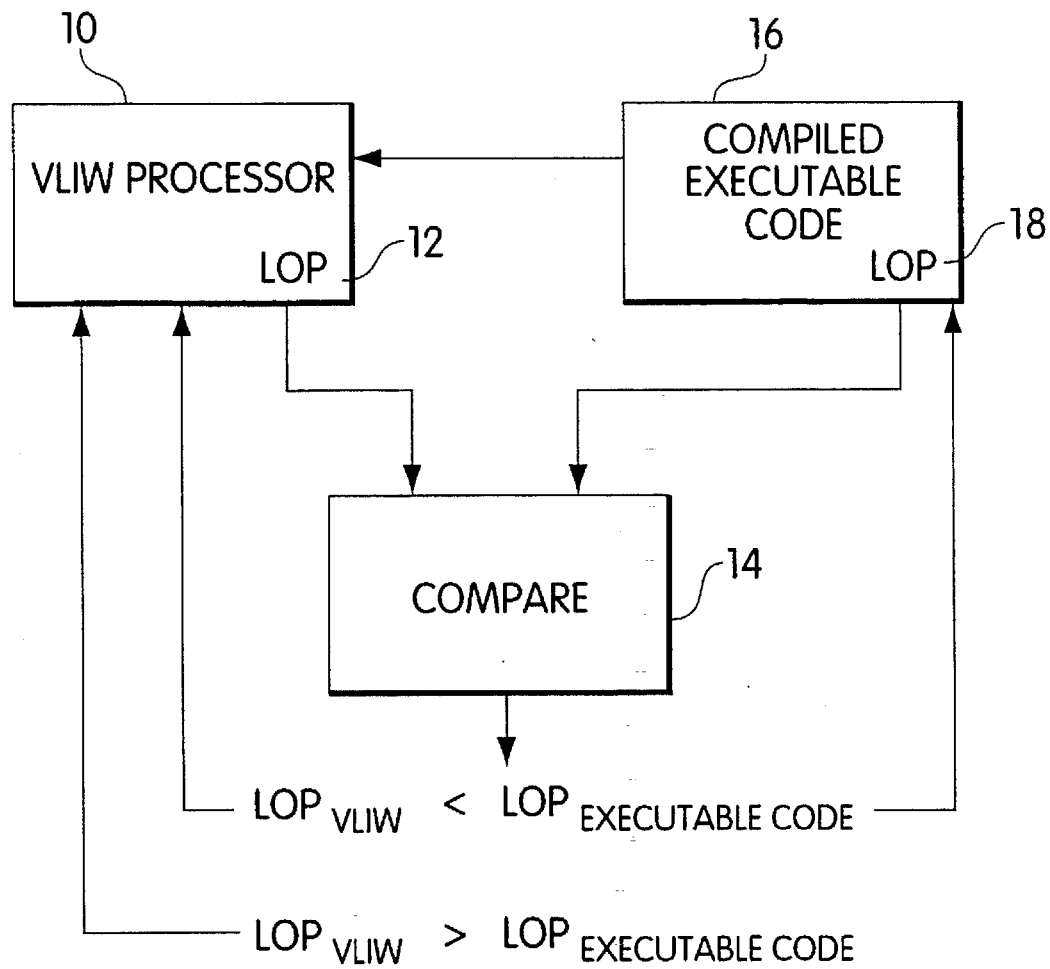
FIG. 1A is a block diagram of the subject system illustrating the comparison of the level of parallelism of an VLIW processor with that of compiled executable code to be able to match the LOPs of the processor and executable code.

Referring now to FIG. 1A, a VLIW processor 10 having an LOP 12 is coupled to an LOP comparison unit 14. Compiled executable code 16 having an LOP 18 is likewise coupled to comparison unit 14. The LOP of VLIW processor 10 is defined by the number of functional units in the processor, which in turn defines the number of operation fields for the VLIW instruction. It will be appreciated that each operation field is responsible for controlling a given functional unit. Because of this control, the processor can process unit instructions encoded in the operation fields in parallel. Each operation field is designed to accommodate any type of unit instruction, with each unit instruction specifying an operation of the corresponding functional unit.

The executable code, when compiled, has an LOP defined by the number of unit instructions that can be executed in parallel as one VLIW instruction. In general, the length of the VLIW instruction defines the LOP both of the VLIW processor and of the executable code. Thus, the number of functional units of the VLIW processor establishes the length of the VLIW instruction which can be accommodated. It is common when running the compiled executable code on different processors that the length of the VLIW instructions for a given processor will be different than the length of the VLIW instructions corresponding to the executable code.

If the LOP of the VLIW processor is greater than the LOP of the executable code, then all that is necessary for matching is to reduce the LOP of the VLIW processor by inactivating functional units within the processor. It will be appreciated that inactivated functional units can be employed for other operations. On the other hand, if the LOP of the VLIW processor is less than the LOP of the executable code, then the effective VLIW instruction length of the executable code is reduced by executing only portions of each VLIW instruction in the executable code at one time. The portions of the VLIW instruction in the executable code are fetched by the VLIW processor sequentially until the entire VLIW instruction is fetched and executed. In one embodiment, the executable code instruction is sequentially fetched in equal length segments, followed by fetching of the remainder of the instruction. However, as will be described, this fetching sequence with remainder is eliminated when the LOP is expressed as a power of 2, since the VLIW instruction divided up in this manner will have no remainders.

Figure 1B:
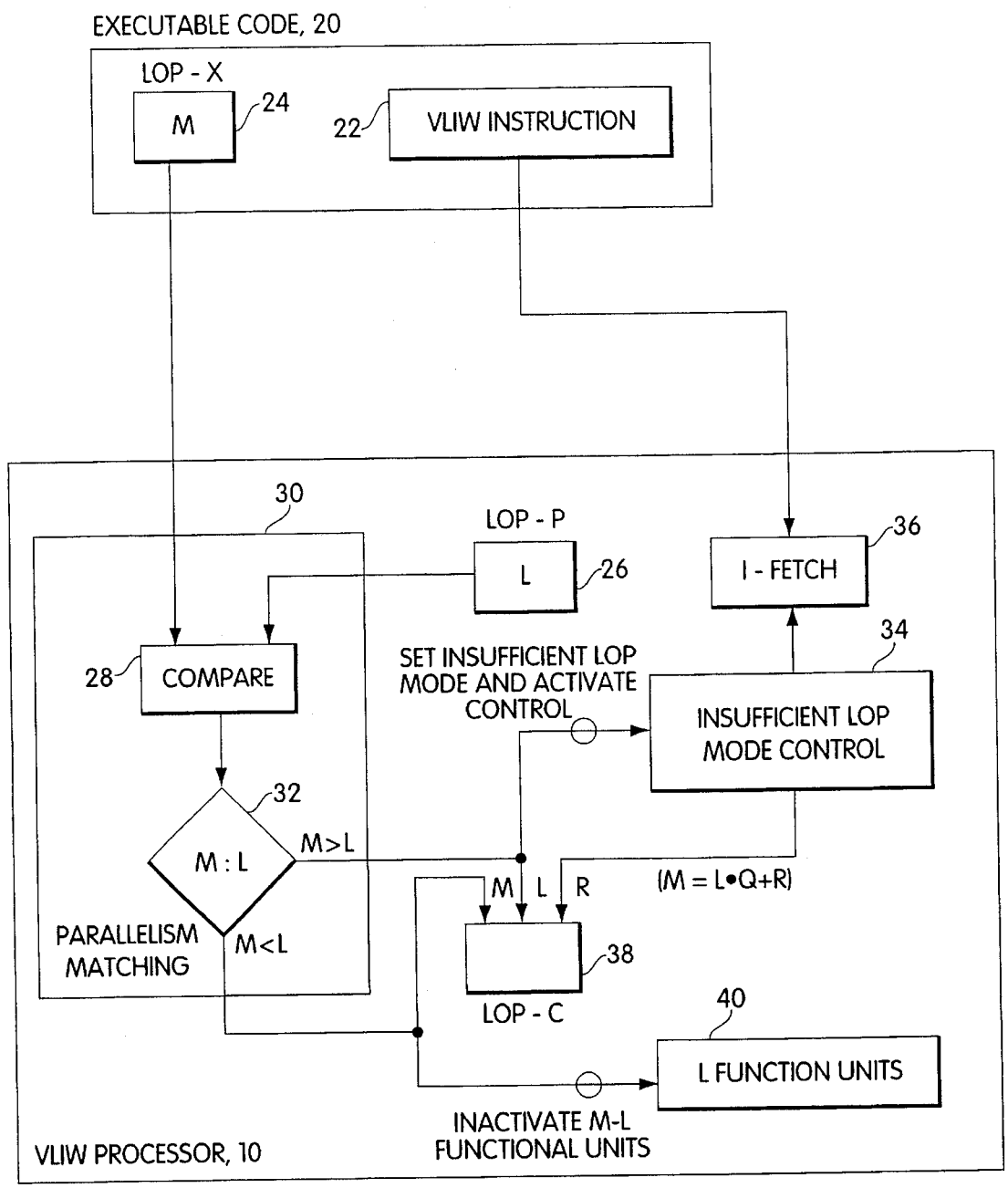
FIG. 1B is a detailed block diagram of the system of FIG. 1A illustrating actions taken when the LOP of the processor is either greater than or less than the LOP of the executable code.

Referring to FIG. 1B, executable code 20 consists of a VLIW instruction 22 and an indication 24 of the LOP of the executable code. In this example, indication 24 is labeled LOP-X, with the LOP of the executable code being referred to herein by X. Note that the LOP of the executable code has a value M, which refers to the number of parallel operations to be performed by an VLIW processor. As illustrated at 26, the LOP of VLIW processor 10, here labeled LOP-P, is indicated by the value L. The LOP-X and LOP-P are compared at 28 in a parallel matching unit 30 as indicated by decision block 32. If M is greater than L, then insufficient mode control 34 is activated to fetch unit instructions from VLIW instruction 22 as indicated at 36. The current LOP, LOP-C, is set to L as indicated at 38. Control 34 thereafter reads out portions of VLIW instruction 22 sequentially. This is accomplished by dividing up the instructions into Q multiples of L. If there is a remainder, this remainder is then executed last. It will be appreciated that LOP-C is set to R so that the remaining portion of the VLIW instruction is executed.

If M is less than L, then, as illustrated at 40, L functional units are activated in VLIW processor 10, with M-L functional units inactivated. The above therefore matches the LOPs of the processor and the executable code to eliminate the aforementioned mismatching problem.

Figure 2:
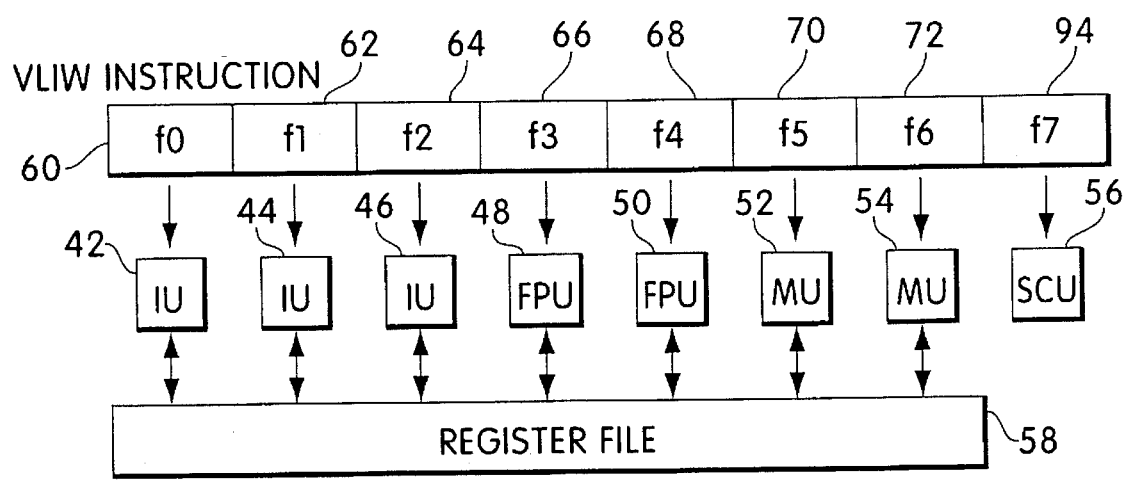
FIG. 2 is a schematic diagram of a VLIW instruction for a conventional VLIW processor illustrating that different fields control different functional units on a one-to-one basis.

Referring to FIG. 2, a diagram of a conventional VLIW processor includes three Integer Units 42, 44, 46, two Floating-Point Units, 48 and 50, two Memory Units 52 and 54, and one Sequence Control Unit 56. The Integer Units perform integer arithmetic and logic operations, such as integer addition and logical AND. The Floating-Point Units perform floating-point arithmetic operations, such as floating-point add and multiply. The Memory Units perform memory access operations, such as load and store. Finally, the Sequential Control Unit performs branch operations. Note that the Integer Units, the Floating-Point Units, and the Memory Units share a Register File 58 containing registers.

The VLIW instruction for this VLIW processor consists of eight operation fields 60, 62, 64, 66, 68, 70, 72, and 74, corresponding to f0 through f7. The fields f0, f1, and f2 each control the operation of an Integer Unit; the fields f3 and f4 each control the operation of an Floating-Point Unit; the fields f5 and f6 each control the operation of an Memory Unit; and the field f7 controls the operation of the Sequence Control Unit.

The VLIW processor shown in FIG. 2 can perform up to eight operations in parallel. As illustrated in FIG. 2, the operations fields of the VLIW instructions for a conventional VLIW processor correspond to the functional units implemented in the VLIW processor, and the functional units are not necessarily of the same kind. Once a VLIW processor is implemented with a certain number of functional units of some kind, it is very difficult to change their number and functionality later to follow advances in computer and semiconductor technologies. Any changes to the number and functionality of functional units require the complete recompilation of all the programs. This is clearly a disadvantage.

FIG. 3A shows a program fragment written in the programming language C as an example source code to describe the operations of a conventional VLIW processor and those of the VLIW processor of the present invention.

FIG. 3B is the assembly code translated from the program fragment in FIG. 3A, using the instructions listed in FIG. 4. In this code, #xyz denotes a register to hold a value for a variable xyz. For simplicity, It is assumed that there are many registers so that all the different variables can be stored in different registers.

Figure 3D:
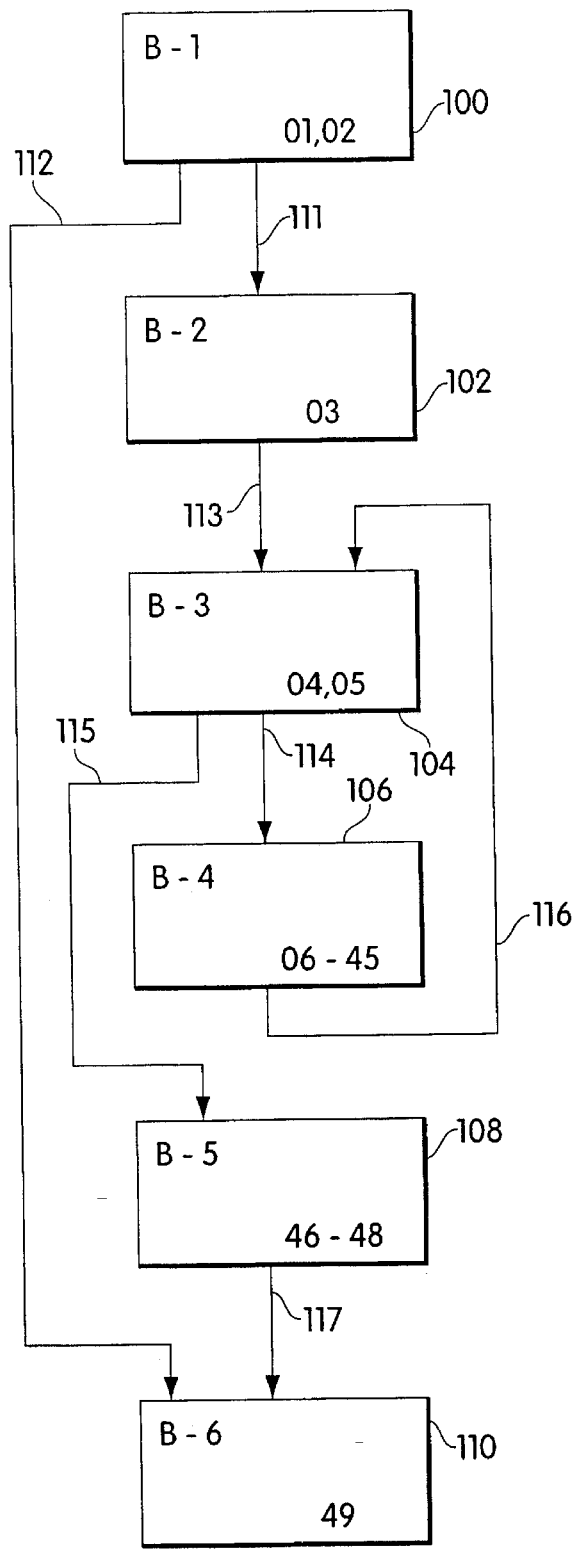
FIG. 3D is a block diagram of the relationships of the basic blocks of the compiled code of FIG. 3B.

FIG. 3C shows the basic blocks and the type and data dependency of each instruction in the assembly code in FIG. 3B. A basic block is a sequential block of instructions that does not contain any branch instruction except at the last location. FIG. 3D shows the relationships among the basic blocks. Note that basic blocks are labeled by reference characters 100, 102, 104, 106, 108, and 110. Basic block 100, labeled B-1, contains instructions 01 and 02. Basic block 102, labeled B-2, contains instruction 03. Basic block 104, labeled B-3, contains instructions 04 and 05. Basic block 106, labeled B-4, contains instructions 06 through 45. Basic block 108, labeled B-5, contains instructions 46 through 48. Finally, basic block 110, labeled B-6, contains instruction 49. Arrows 111 and 112 from basic block 100 indicate a sequential execution path to basic block 102 and a branch path to basic block 110, respectively. Either of these paths is taken, depending on the outcome of the condition test by conditional branch instruction 02. Arrow 113 indicates that execution proceeds unconditionally from basic block 102 to basic block 104. Arrows 114 and 115 indicate a sequential execution path to basic block 106 and a branch path to basic block 108, respectively. Either of the paths is taken, depending on the outcome of the condition test by conditional branch instruction 05. Arrow 116 from basic block 106 to basic block 104 indicates a unconditional branch path taken by branch instruction 45. Arrow 117 from basic block 108 to basic block 110 indicates a sequential execution path. These arrows determine the order of execution of the basic blocks in terms of control flow, which is defined by branch instructions.

Within a basic block which does not contain any branch instruction except at the last location, the data dependency of the instructions is checked to see if these instructions can be executed in parallel. In general, there are three types of data dependency between two instructions. Consider the following instruction sequence.

(A) add r1, r2, r3

(B) add r4, r5, r1

(C) add r2, r6, r7

(D) add r2, r2, r9

The first type of data dependency occurs when a value stored by an instruction is used in some other instruction. This dependency is found between the instructions (A) and (B). The instruction (A) adds two values stored in r2 and r3 and stores the result in r1, which is used by the instruction (B). Because of this dependency relation, the instruction (B) must be executed after the instruction (A).

The second type of data dependency occurs when a value is overwritten by an instruction after it is used in some other instruction. This dependency is found between the instructions (A) and (C). The instruction (C) stores a value in r2 after the instruction (A) uses a value in r2. Because of this decency relation, the instruction (A) must precede the instruction (C).

The third type of data dependency occurs when a value is overwritten by an instruction after it is written by some other instruction. This dependency is found between the instructions (C) and (D). The instruction (D) stores a value in r2 after the instruction (C) stores a value in the same register. Because of this dependency relation, the instruction (C) has to precede the instruction (D).

In the assembly code shown in FIG. 3B, there are only data dependencies of the first kind among the instructions.

Figure 3E:
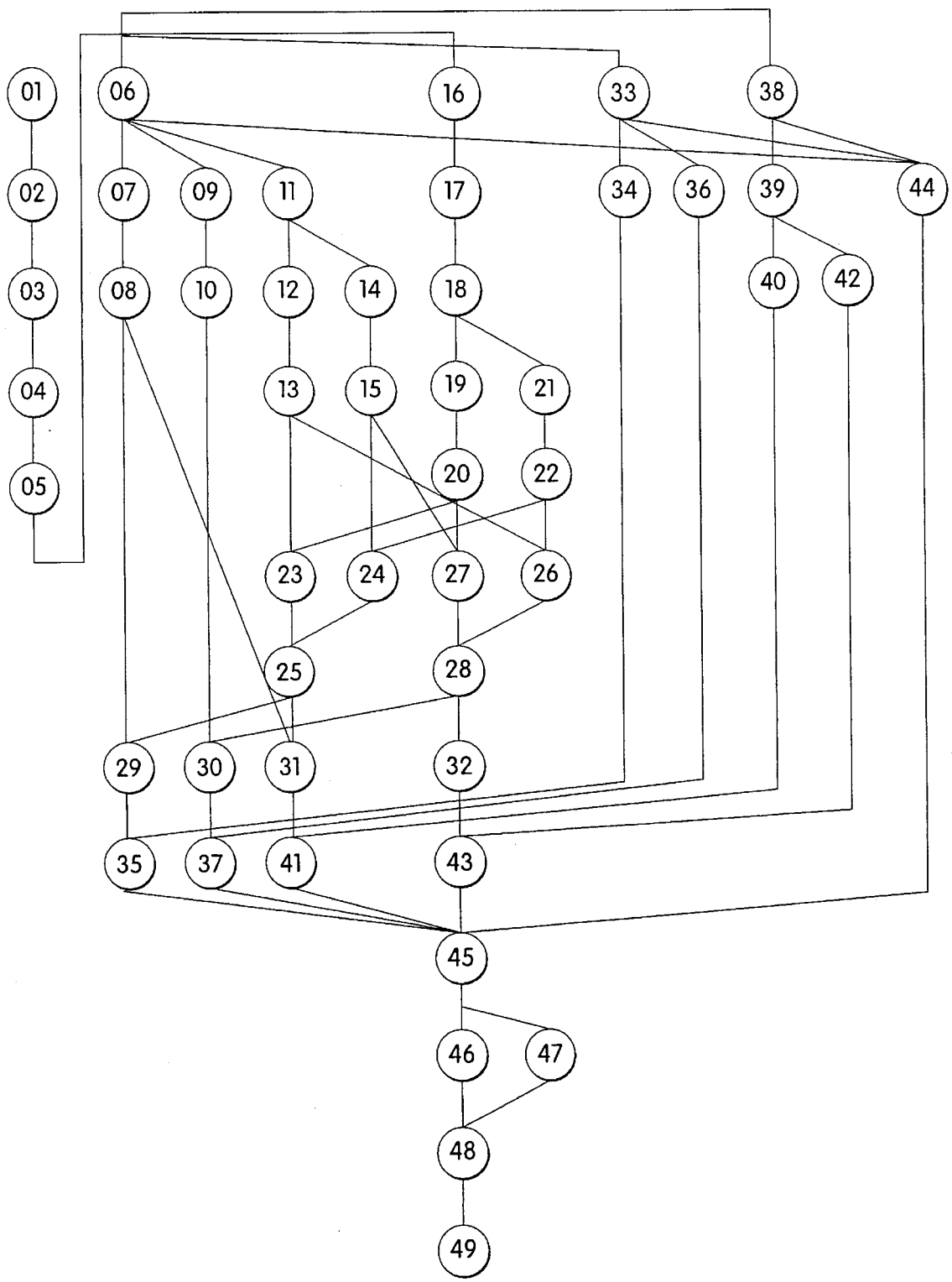
FIG. 3E is a graph of dependency of all the compiled instructions of FIG. 3B illustrating the order of execution of the instructions of FIG. 3B.

FIG. 3E shows the dependency graph of the assembly code in FIG. 3B, where an instruction at a higher node must be executed before the instructions at lower nodes dependent on the instruction at the higher node. In this directed graph the number of each node referred to is the number identifying an instruction. The graph therefore specifies the order of execution of the instructions. It will be noted that several instructions can be executed in parallel, namely instructions 06, 16, 33, and 38. Since instructions 08, 10, 12, 14 and 18 are independent, they too can be executed in parallel This graph therefore indicates the possibility of parallel execution of the instructions.

FIG. 4 summaries the instructions used in FIG. 3B. Note that the list of instructions shown in FIG. 4 includes only those used in FIG. 3B and that the instructions summarized describe integer, floating-point, memory, and sequence control instructions.

FIG. 5 shows an executable code generated from the assembly code in FIG. 3B for a conventional VLIW processor, such as the VLIW processor shown in FIG. 2. It is generated by packing up to eight instructions that can be executed in parallel into a VLIW instruction. Note that symbol "–" indicates NOP or No Operation.

The number of NOP fields greatly affects the efficiency of the VLIW processor as well as the size of executable code. A program that is abundant in parallelism is expected to be compiled into a compact executable code containing a small number of NOP fields. On the other hand, a program that is not abundant in parallelism is expected to be compiled into a large inefficient executable code containing a large number of NOP fields, The code efficiency is also affected significantly by the compiler's capability of detecting parallelism in programs.

Since the VLIW instruction format directly reflects the internal structure of the VLIW processor in terms of functional units, it is very difficult and very inefficient, if possible, to use the same VLIW instruction set for the VLIW processors which have different structures. Thus, it is almost impossible to keep object-level code compatibility among different VLIW processor implementations, which may be required for different applications.

The following lists the problems with the conventional VLIW processors. First, a VLIW processor can not efficiently support a wide range of programs which differ in the amount of parallelism. Second, the VLIW compiler tends to be large and very complicated because it has to use sophisticated but time-consuming techniques to produce the quality code which contains a small number of NOP fields in the VLIW instructions. Third, any changes to the functional units in the VLIW processor cause the complete recompilation of all the programs. Finally, it is very difficult and inefficient to use the same VLIW instruction set for different VLIW processor implementations. Thus, the conventional VLIW processor architecture is not scalable.

In order to overcome the disadvantages of the conventional VLIW processors, the present invention comprises a new scalable VLIW processor architecture which allows different processor implementations in terms of functional units.

Figure 6A:
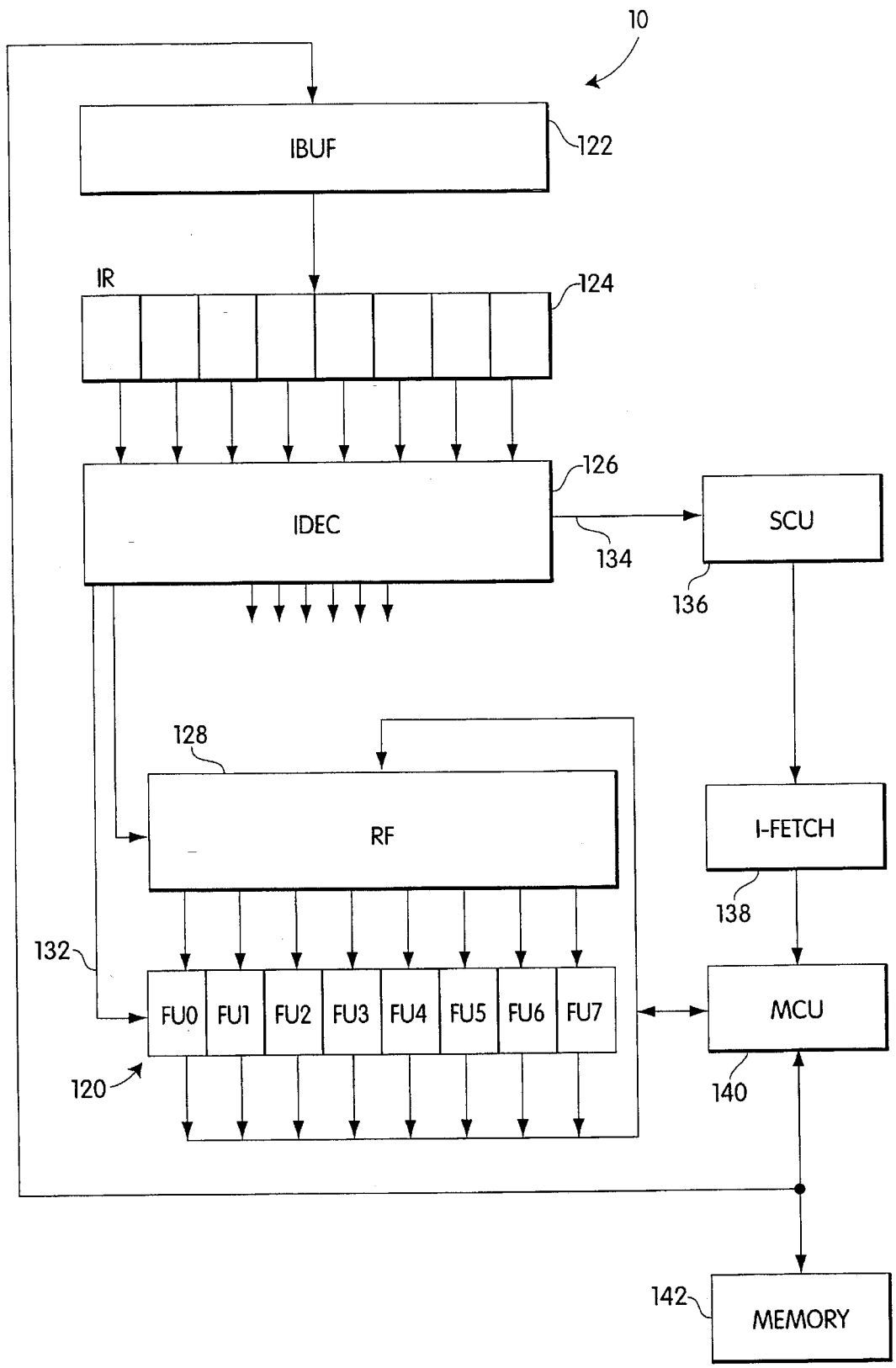
FIG. 6A is a block diagram of the detailed organization of the VLIW processor with eight functional units corresponding to an LOP of eight, in which the LOP of the processor is equated to the number of functional units, which are in turn equated to the number of the fields of the VLIW instruction.

FIG. 6A shows a block diagram of the VLIW processor of the present invention, namely VLIW processor 10 of FIGS. 1A and 1B. Processor 10 includes eight identical functional units 120, labeled FU0 through FU7. In general, the number of functional units can be any number. Processor 10 includes an instruction buffer 122 coupled to an instruction register 124, which is in turn coupled to an instruction decoder 126. Instruction decoder 126 provides control information to various blocks within processor 10, including register addresses coupled to register file 128 via a line 130. Instruction decoder 126 also provides control signals over line 132 representative of types of operations to be performed by functional units.

Instruction decoder 126 also provides signals over line 134 to a sequence control unit 136 to control instruction fetching via instruction fetch unit 138. Instructions are fetched via memory control unit 140 from memory 142 by providing appropriate addresses to memory 142. The result is the readout of memory 142 to instruction buffer 122. Memory control unit 140 is also used to fetch data from memory 142 and store this data in a register in register file 128. Moreover, memory control unit 140 is used to store data from a register in register file 128 to memory 142.

Figure 6B:
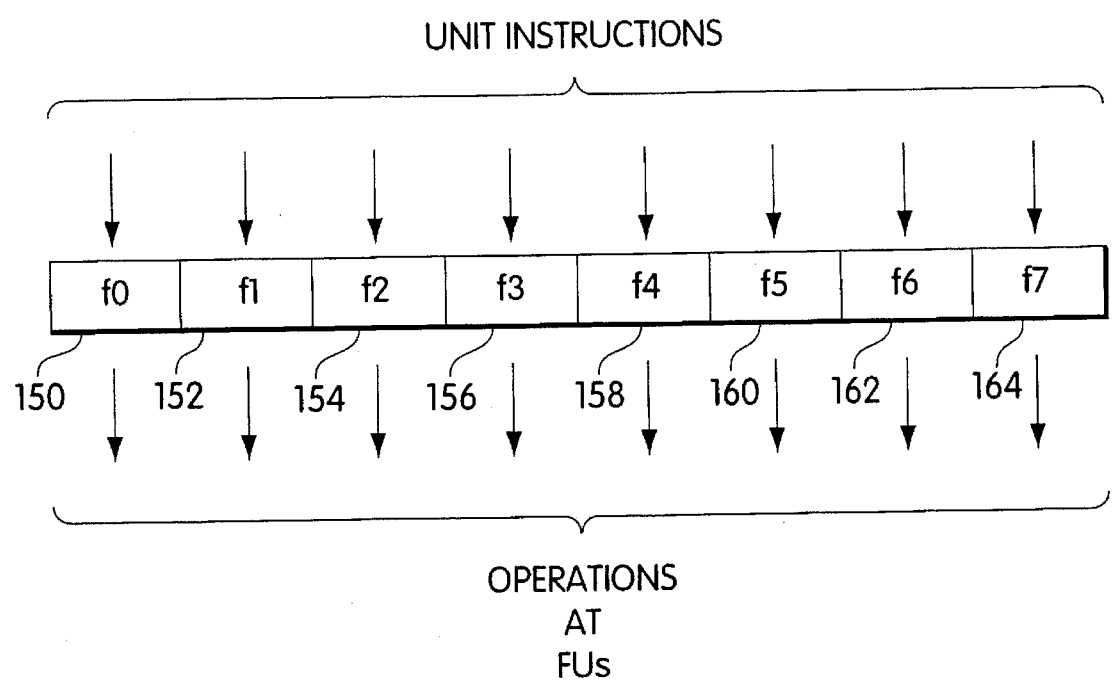
FIG. 6B is a diagrammatic illustration of one of the VLIW instructions for the VLIW processor of FIG. 6A showing that each field of the VLIW instruction can contain any type of unit instruction, with each field controlling one function unit.
Figure 7A:
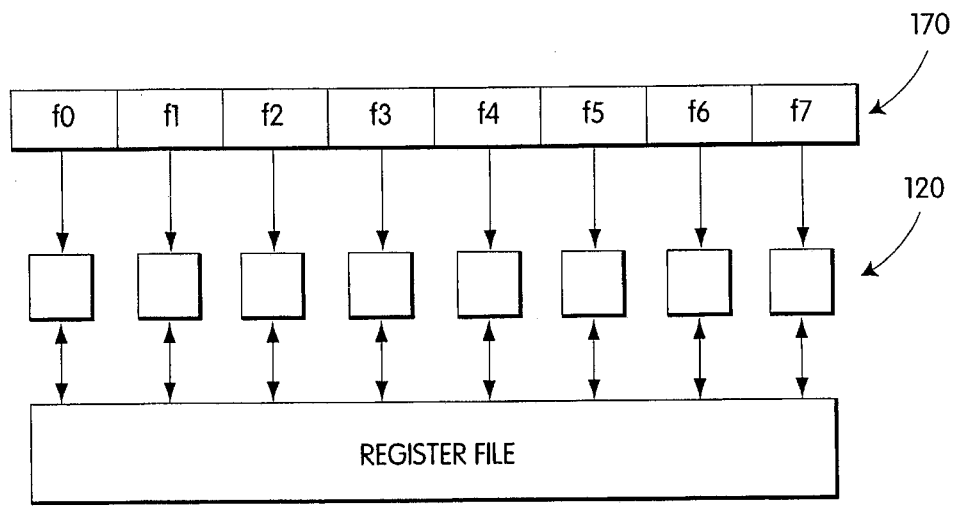
FIGS. 7A, 7B, 7C, and 7D are diagrammatic illustrations of a full set of functional units which are selectively inactivated in blocks to adjust the LOP of the VLIW processor to the LOP of the executable code.
Figures 7B, 7C, 7D:
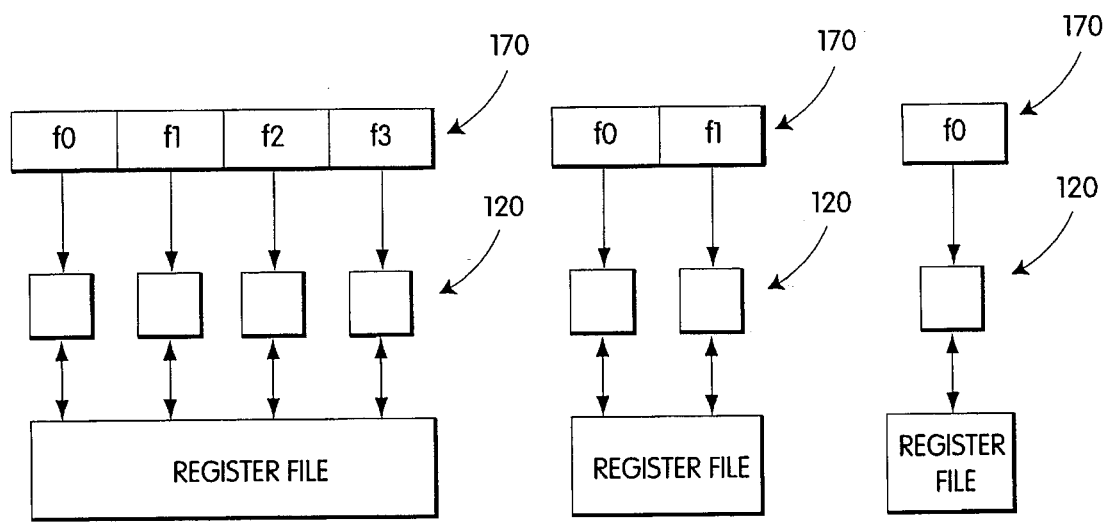

FIG. 6B shows a VLIW instruction format for the VLIW processor shown in FIG. 6A. It consists of eight operation fields 150, 152, 154, 156, 158, 160, 162, and 164 indicated by f0 through f7. Each field holds but one unit instruction that specifies an operation to be performed at one of the functional units. Unlike the conventional VLIW instruction in which each field is dedicated to a particular operation at the functional unit of a particular kind, the VLIW instruction of the present invention allows any unit instruction to be placed in any field.

The VLIW instruction defined as part of the VLIW architecture consists of N operation fields, each containing one unit instruction, which is one of the traditional instructions used in conventional sequential, i.e., non-parallel, processors, such as arithmetic and logic instructions, or one of the special instructions newly defined for the VLIW architecture.

In general, the VLIW instructions with N operation fields are called N-long instructions; a set of N-long instructions is called an N-long instruction set. The N unit instructions contained in an N-long instruction do not have any mutual dependency in terms of resource accesses (e.g., register and memory accesses) so that they can be executed in parallel. The VLIW instruction illustrated in FIG. 6B is the 8-long instruction.

The VLIW processor can use k functional units ($0 < k \leq 8$) by inactivating 8-k functional units. FIGS. 7A–7D show four configurations of functional units 120, respectively incorporating 8, 4, 2, and 1 functional units depending on the number of unit instructions 170 to be executed. The number of functional units is obtained in one embodiment by inactivating 0, 4, 6, and 7 functional units out of the original set of eight.

In one aspect of the present invention, the level of parallelism, or LOP, which is equal to the number of operations that can be each performed by unit instructions in parallel, is defined for VLIW processors and compiled executable codes consisting of VLIW instructions. The VLIW processor matches its LOP against the LOP of the executable code.

A VLIW processor that can execute an N-long instruction set is said to have LOP=N, that is, the processor can execute in parallel N operations specified by the N unit instructions in the N-long instruction. The VLIW processor with LOP=N has N functional units, each of which can executes one unit instruction specified by one operation field of the N-long instruction. Each of the N functional units operates like an independent CPU (Central Processing Unit) in a conventional sequential processor, except that all the N functional units share one instruction fetch block, one sequence control block, one register file block, and one memory control block.

The level of parallelism is also defined for the compiled executable code. An executable code with LOP=N can be executed by executing sequences of N unit instructions as N-long instructions. When the VLIW compiler compiles a program into an executable code with LOP=N, it guarantees that the N unit instructions in any sequence that is fetched as an N-long instruction have no mutual dependency in terms of resource accesses so that they can be executed in parallel.

In the subject invention, one instruction called the LOP instruction is defined to indicate the level of parallelism of the executable code. When it is executed in a VLIW processor, the processor's parallelism matching mechanism adjusts its level of parallelism (LOP) with the code's level of parallelism (LOP).

Figure 8:
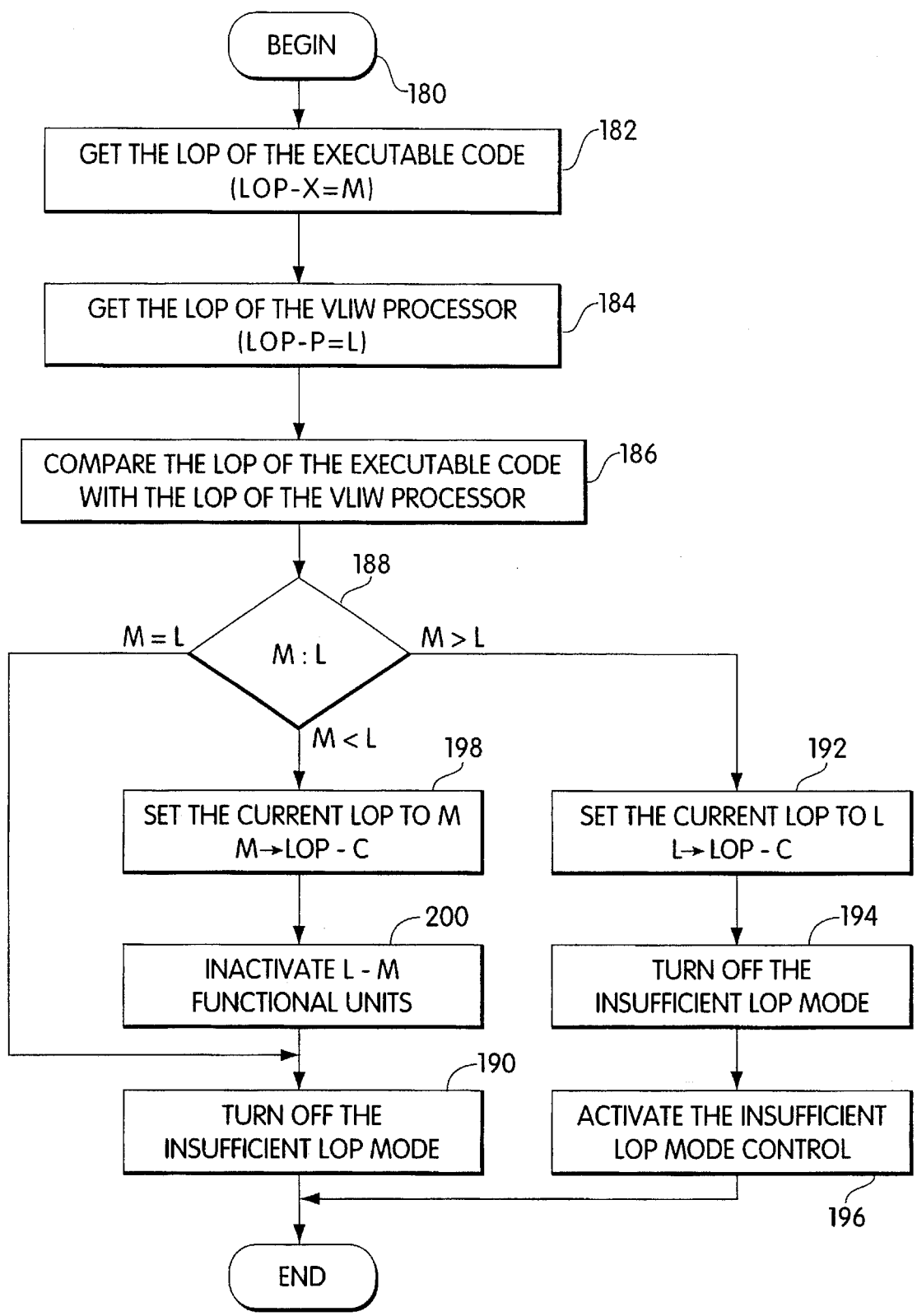
FIG. 8 is a flow chart describing the operation of the subject system for the matching of the LOP of the VLIW processor with the LOP of the executable code.

Referring to FIG. 8, a flow chart is presented which indicates the subject parallelism matching mechanism. Process begins at 180, in which the LOP of the executable code is derived at 182. The LOP of the VLIW processor is derived at 184, with the LOPs of the executable code and the VLIW processor being compared at 186 via decision block 188. If M is equal to L, the insufficient LOP mode is turned off at 190. If M is less than L, the current LOP of the processor is set to M at 198, which inactivates L-M functional units at 200, likewise turning off the insufficient LOP mode at 190. If M is greater than L, then the current LOP set to L at 192, which represents the current LOP of the VLIW processor. Thereafter, the insufficient LOP mode is turned on at 194 and the insufficient LOP mode is activated at 196. The insufficient LOP mode refers to a special mode in which the VLIW processor fetches a VLIW instruction in pieces from the executable code.

By way of example, if the processor's LOP is L and the code's LOP is M. If L=M, then no special action is taken since the processor is ready to execute M-long instructions with its M functional units. If L>M, then the processor reduces its LOP to match against the LOP of the code by inactivating L-M functional units.

If L<M, then the processor does not change its LOP but sets its execution mode to a special mode called the insufficient LOP mode, in which the processor executes Q L-long instructions and one R-long instruction to complete the execution of an M-long instruction, where $M=L \times Q+R$ with $Q>0$ and $0 \leq R<L$. When the processor executes the last R-long instruction, it reduces its LOP to R by inactivating L-R functional units. This way of executing an M-long instruction causes no problem, because any subsequent L or R unit instructions in an M-long instruction can be executed in parallel, since the M unit instructions in the M-long instruction do not have any mutual dependence.

Figure 9:
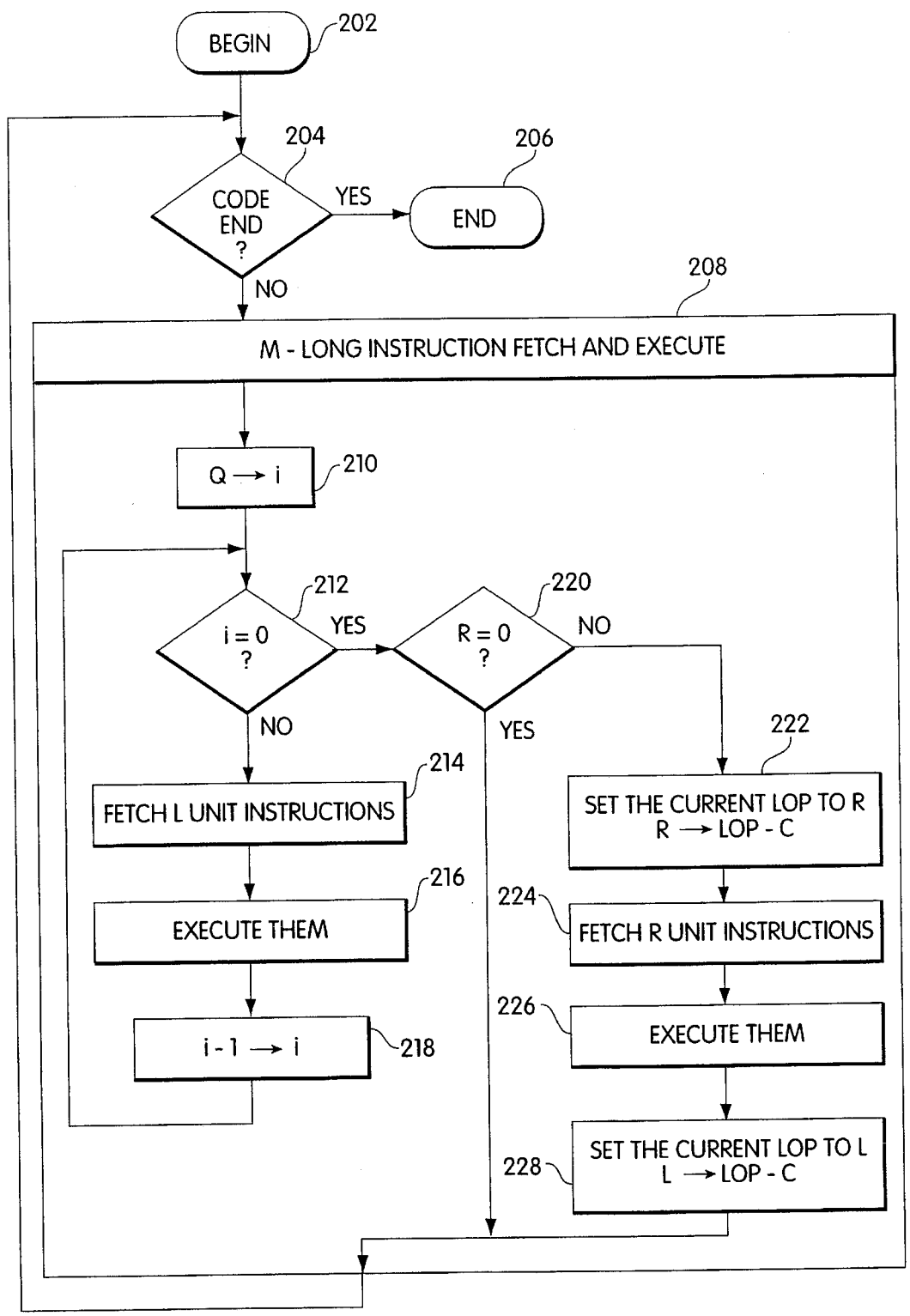
FIG. 9 is a flow chart describing the operation of the subject system when the LOP of the VLIW processor is less than the LOP of the executable code, illustrating the insufficient LOP mode.

Referring to FIG. 9, how the insufficient LOP mode operates is described. Beginning at 202, a code end is checked at 204. If the code end is detected at 204, the process ends at 206. If not, an M-long instruction is fetched and executed at 208. The fetch and execution of the M-long instruction is repeated until the code end is detected at 204.

With the M-long instruction fetch and execution block 208, Q, the quotient obtained by dividing M by L, is assigned to i at 210. Decision block 212 checks whether the value of i is equal to zero. If it is not, then L unit instructions are fetched at 214 and then executed at 216. The value of i is decremented by 1 at 218, and execution goes back to decision block 212. If the value of i is found to be zero at 212, then the value of R, the remainder obtained by dividing M by L, is checked at 220. If R is equal to zero, then the M-long instruction fetch and execution block 208 ends. If R is not equal to zero, then LOP-C, the current LOP, is set to R at 222. Then R unit instructions are fetched at 224 and executed at 226. After the execution of the R unit instructions at 226, the current LOP is set back to L at 228 and the M-long instruction fetch and execution block 208 ends.

In one embodiment, the LOP of the executable code is transmitted to the VLIW processor by a special instruction called match, whose format is as follows: match lop.

The execution of this instruction in a VLIW processor activates its parallelism matching mechanism to adjust its LOP with the LOP of the executable code specified by the operand of the match instruction.

Figure 10:
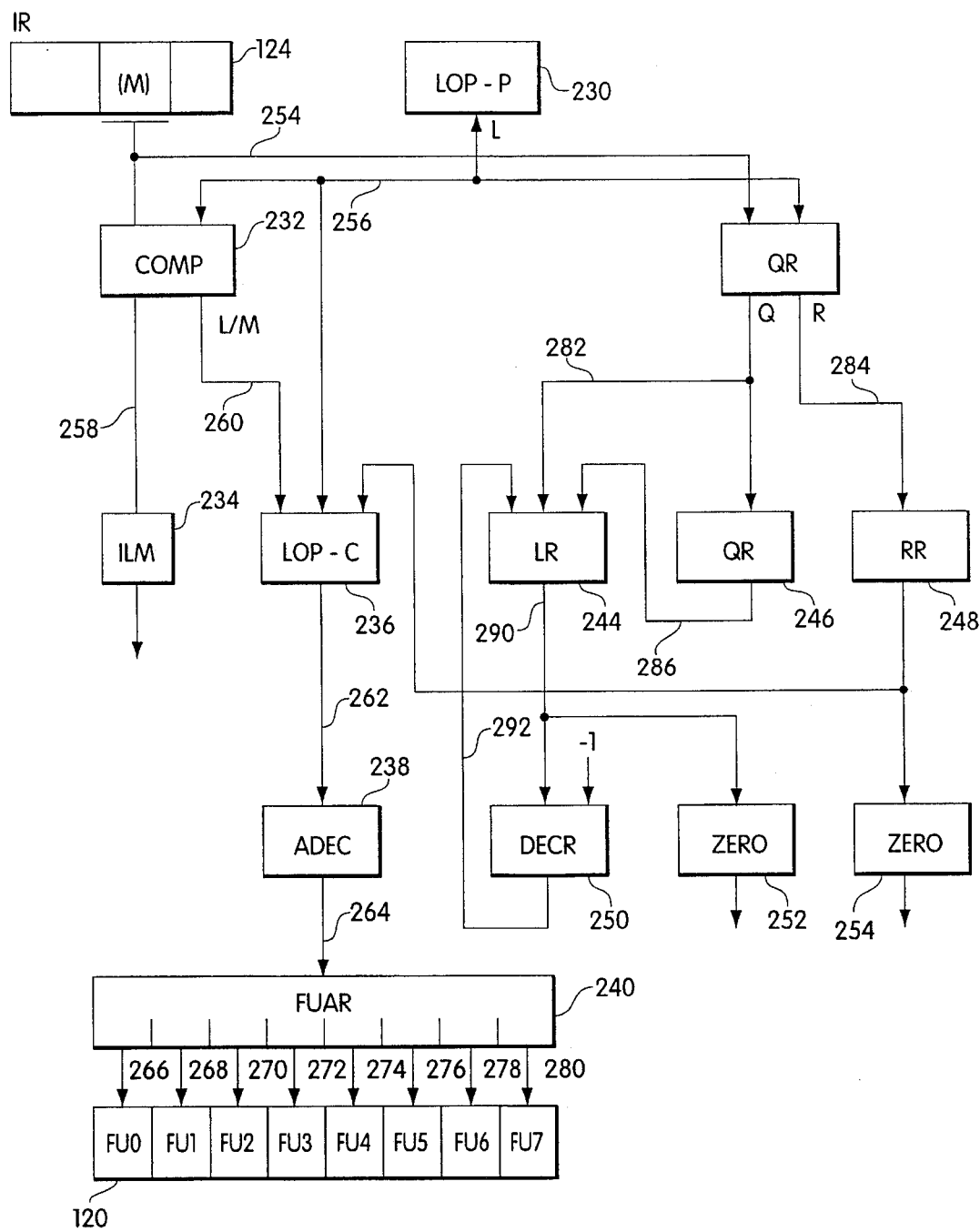
FIG. 10 is a block diagram illustrating a hardware implementation for a VLIW processor for the execution of the LOP matching algorithm of FIGS. 8 and 9.

FIG. 10 shows one embodiment of the parallelism matching mechanism and the insufficient LOP mode control in hardware. Instruction register 124, labeled IR, holds the LOP of the executable code, whose value is M in this example. For instance, the aforementioned match instruction with the LOP of the executable code as its operand is stored in instruction register 124. The LOP of the VLIW processor is stored in register 230, labeled LOP-P. The value of the LOP of the VLIW processor is L in this example. Instruction register 124 and LOP-P register 230 are coupled to comparator 232 via lines 254 and 256, respectively. Comparator 232 compares the LOP of the executable code and the LOP of the VLIW processor. The output of comparator 232 turns on insufficient LOP mode flag 234 via line 258, if M is greater than L. The current LOP value produced at comparator 232 is stored in LOP-C register 236 via line 260. The value stored in LOP-C register 236 is sent via line 262 to activation decoder 238, which generates activation signals for functional units and sends them via line 264 to functional unit activation register 240. Activation signals from activation register 240 control functional units 120 via lines 266, 268, 270, 272, 274, 276, 278, and 280.

LOP-P register 230 is also coupled to the LOP-C register 236 via line 256, through which the original LOP of the VLIW processor stored in register 230 is copied to LOP-C register 236. This happens after a remainder portion of the VLIW instruction is fetched and executed in the insufficient mode sequence.

Instruction register 124 and LOP-P register 230 are also coupled to quotient/remainder block 242 via lines 254 and 256, respectively. Quotient/remainder block 242 computes the quotient Q and the remainder R by dividing M by L to send via lines 282 and 284 to Q and R registers 246 and 248, respectively. The quotient computed at 242 is also stored via line 282 in L register 244, which is used to keep track of the number of the portions of the VLIW instruction to fetch. Every time a VLIW instruction is to be fetched from the executable code, the quotient Q from Q register 246 is stored via line 286 in L register 244. L register 244 is coupled via line 290 to decrementer 250 where the value in L register 244 is decremented by 1. Decrementer 250 is coupled to L register 244 via line 292 to store the updated count. L register 244 is also coupled via 290 to zero checker 252, where the value of the count in register 244 is checked to be zero.

R register 248 is coupled to zero checker 252 and LOP-C register via line 288. When the count in L register 244 becomes zero, which is detected at 252, the value in R register 248 is checked to ascertain if it is zero at 252. If R register 248 holds a non-zero value, the value is stored in LOP-C register 236 via line 288 so that the last portion of the VLIW instruction can be fetched from the executable code for execution.

Figure 11:
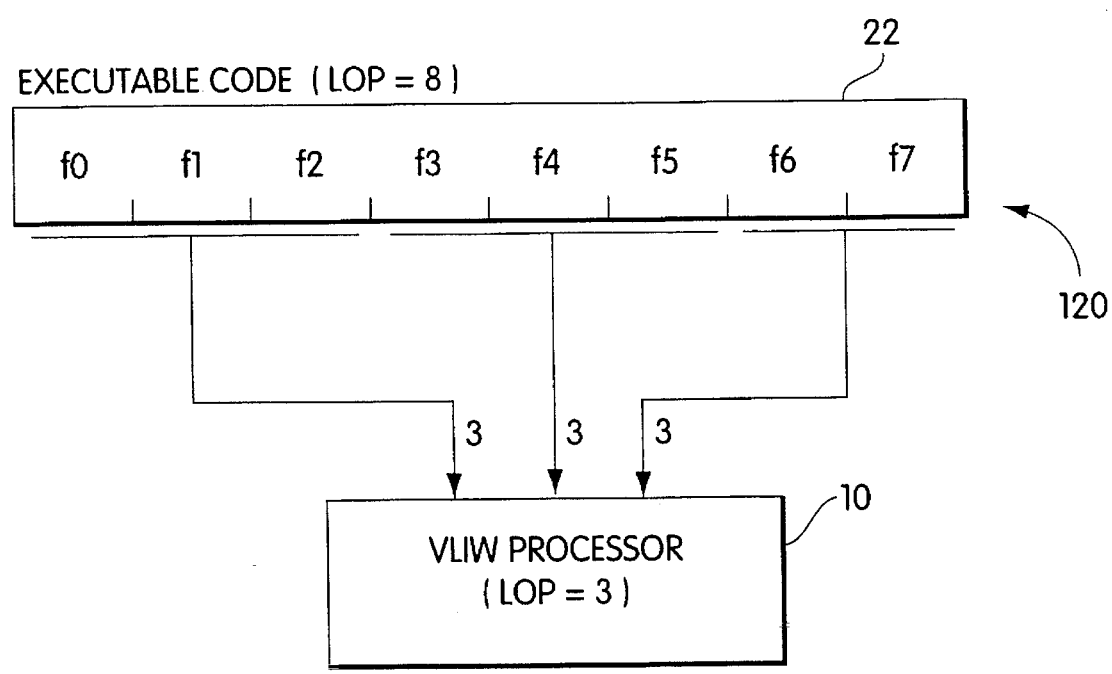
FIG. 11 is a diagrammatic illustration of an executable code having an LOP of eight in which the LOP of executable code is fetched by the VLIW processor having an LOP of 3 to execute the executable code sequentially in such a manner that the lower LOP of the VLIW processor is accommodated.

FIG. 11 shows a case of the insufficient LOP mode control, where the LOP of executable code 20 is 8, while the LOP of VLIW processor 10 is 3. VLIW instruction 22 has eight operation fields labeled f0 through f7. Since the LOP of VLIW processor 10 is less than the LOP of executable code 20, processor 10 fetches and executes VLIW instruction 22 by dividing it into three portions. The first portion consists of three unit instructions in fields f0 through f2, the second portion consists of three unit instructions in fields f3 through f5, and the last portion consists of two unit instructions in fields f6 and f7. These portions are sequentially fetched and executed in VLIW processor 10.

An executable code whose LOP is greater than the LOP of a VLIW processor can be easily converted to one with the LOP equal to that of the VLIW processor by a VLIW compiler. This conversion is sometimes desirable in terms of execution performance, because the insufficient LOP mode of the VLIW processor is not necessarily efficient.

Figure 12:
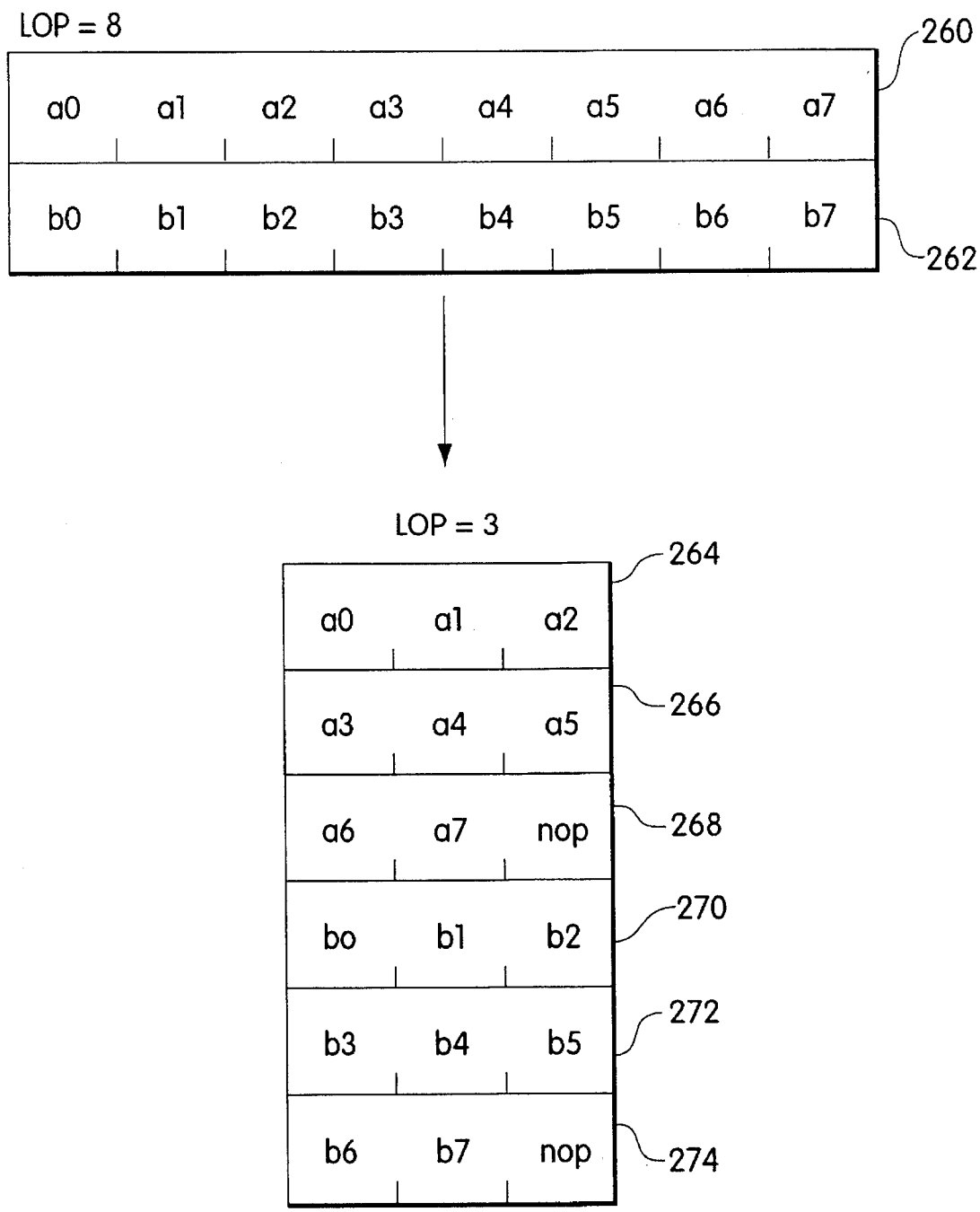
FIG. 12 is a diagrammatic illustration of one example of the conversion of executable code having an LOP of eight to an executable code having an LOP of 3.

FIG. 12 shows such a conversion, where a VLIW processor has an LOP of 3 and an executable code has an LOP of 8. The executable code consists of two 8-long instructions 260 and 262. Instruction 260 contains eight unit instructions a0 through a7, and instruction 262 contains eight unit instructions b0 through b7. The executable code is converted to one with an LOP of 3 by converting each 8-long instruction to three 3-long instructions. Instruction 260 is converted to three 3-long instructions 264, 266, and 268, and instruction 262 to three 3-long instructions 270, 272, and 274. In order to make complete 3-long instructions, a NOP unit instruction is inserted in instructions 268 and 274.

The above mentioned general case requires a complicated instruction execution mechanism. In order to simplify the execution mechanism, the processor's level of parallelism, L, and the execution code's level of parallelism, M, are chosen as powers of 2. That is, L, M=1, 2, 4, 8, . . . Then, for L<M, M=L×Q+R, where R=0, that is, the processor executes Q L-long instructions to complete an M-long instruction. This scheme essentially eliminates the insufficient LOP mode to take a special action for the remainder portion in instruction execution, since a sequence of M-long instructions in an executable code can be simply interpreted as a sequence of L-long instructions with Q L-long instructions per M-long instruction without requiring any special actions.

Figure 13:
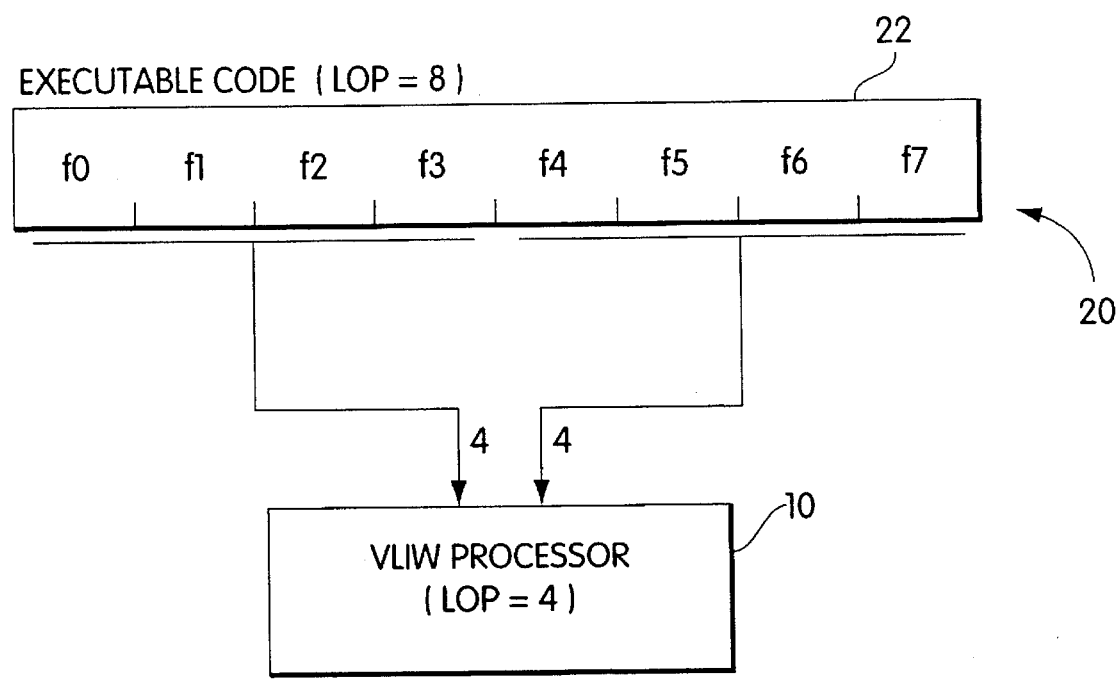
FIG. 13 is a diagrammatic illustration of the result of formulating the LOPs as powers of 2 to eliminate the requirement of processing remaining code fields when the LOP of the VLIW processor is less than the LOP of the executable code, thus to effectively eliminate the requirement for the insufficient LOP mode control of FIG. 10.

FIG. 13 shows a case of the insufficient LOP mode control, where the LOP of executable code 20 is 8, while the LOP of VLIW processor 10 is 4. VLIW instruction 22 in executable code 20 consists of eight operation fields labeled f0 through f7. Since the LOP of VLIW processor 10 is less than the LOP of executable code 20, processor 10 fetches two portions of VLIW instruction 22 sequentially. Note that no remainder portion need be fetched in this case.

Figure 14:
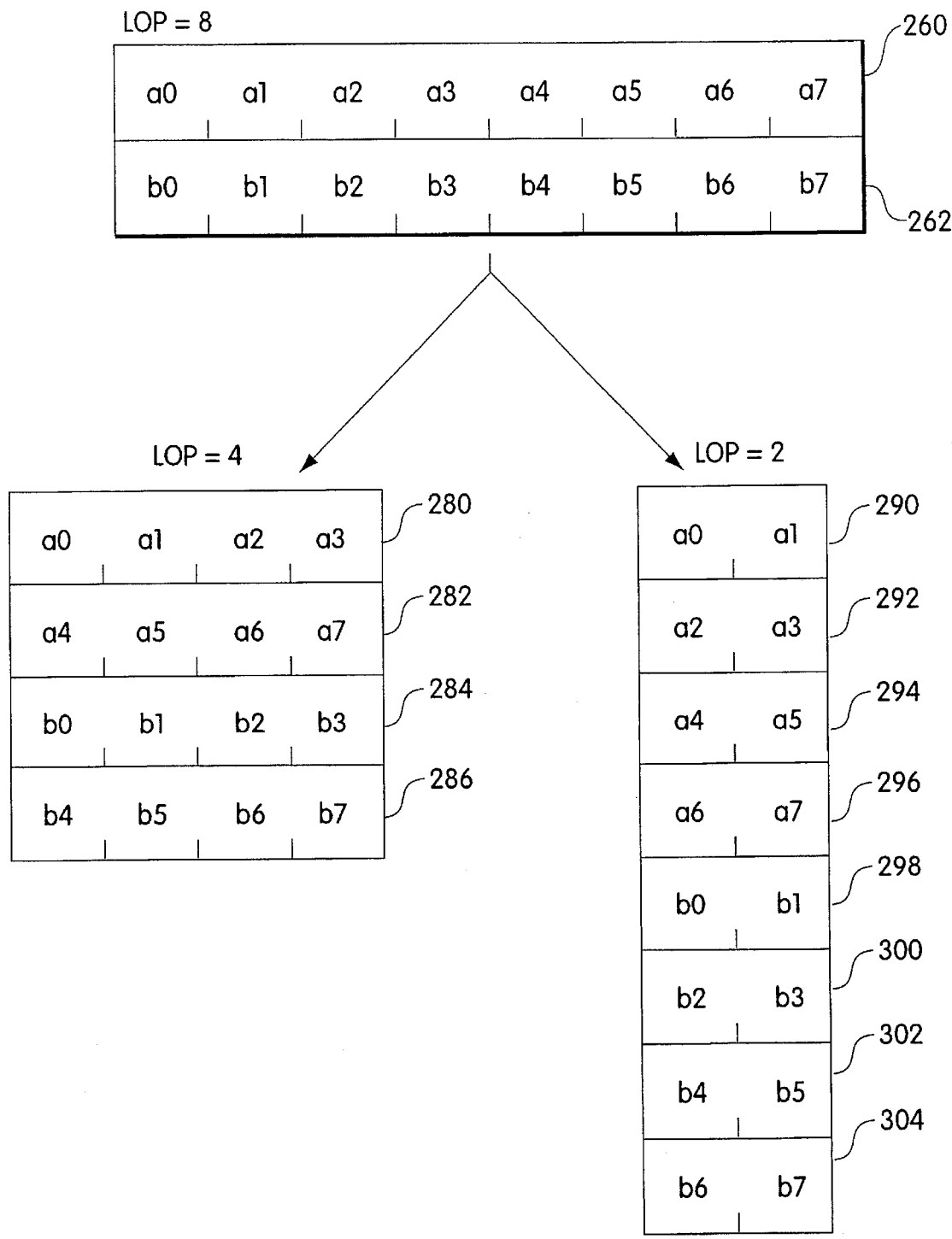
FIG. 14 is a diagrammatic illustration of the conversion of executable code having an LOP expressed as a power of 2, namely an LOP of 8, into executable code also expressed as a power of 2, namely an LOP of 4 and an LOP of 2, in which the executable code need not be actually changed due to the fact that the LOP is defined in terms of powers of 2; and, FIG. 15 is a listing of the VLIW instructions for the VLIW processor of FIGS. 6A and 6B.

FIG. 14 shows conversions from an executable code with LOP=8 to one with LOP=4 and one with LOP=2. The execution code consists of two 8-long instructions 260 and 262, which are the same instructions shown in FIG. 12. Instructions 260 and 262 are converted to four 4-long instructions 280, 282, 284, and 286 and to eight 2-long instructions 290, 292, 294, 296, 298, 300, 302, and 304. Since all the LOPs are powers of 2, there is no remainder portion to be considered as in FIG. 12. Each conversion is merely a different interpretation of a sequence of unit instructions.

FIG. 15 shows an executable code obtained from the assembly code of FIG. 3B for the VLIW processor of the present invention with LOP=4. The executable code consists of seventeen 4-long instructions 01 through 17. Note that forty unit instructions contained in block 106 of FIG. 3D are packed in ten 4-long instructions 06 through 15.

Thus, with the level of parallelism embedded in the LOP instruction and the parallelism matching mechanism in a VLIW processor, an executable code can be executed in different VLIW processors with different levels of parallelism. Conversely, different executable codes with different levels of parallelism can be executed in a VLIW processor.

Having above indicated several embodiments of the Subject Invention, it will occur to those skilled in the art that modifications and alternatives can be practiced within the spirit of the invention, It is accordingly intended to define the scope of the invention only as indicated in the following claims.

I claim:

1. Apparatus for increasing the efficiency of a VLIW processor having functional units for the parallel processing of VLIW instructions embedded in compiled executable code, comprising:

means for establishing the level of parallelism of said processor;

means for establishing the level of parallelism of said executable code;

means when the level of parallelism of said processor exceeds that of said executable code for inactivating that number of said functional units which brings the level of parallelism of said processor to match that of said executable code; and, means when the level of parallelism of said processor is less than that of said executable code for sequentially reading out portions of said executable code processable by the existing functional units of said processor whereby the level of parallelism of said processor and said executable code are matched.

2. The Apparatus of claim 1 wherein said executable code has fixed length instructions.

3. The Apparatus of claim 2 wherein the level of parallelism is equal to the number of operations that are mutually independent such that said operations can be performed in parallel.

4. The Apparatus of claim 3 wherein said instructions have N operation fields capable of taking any unit instruction and corresponding to N-long instructions, with each of said operation fields specifying one unit instruction, said processor executing in parallel N operations specified by N unit instructions in an N-long instruction, whereby there is no restriction on allocating any instruction to a field for achieving parallel processing.

5. The Apparatus of claim 4 wherein the level of parallelism is equal to N.

6. The Apparatus of claim 5 wherein said executable code has equal portions of executable code plus a remainder portion and wherein said sequential read out means includes means for first reading out all equal portions followed by read out of said remainder portion.

7. The Apparatus of claim 6 wherein the level of parallelism of said processor and said executable code are chosen as powers of 2.

8. The Apparatus of claim 5 wherein said executable code has a level of parallelism N, and wherein said means for reading out portions of said executable code includes means for executing sequences of N unit instructions.

9. The Apparatus of claim 2 wherein the length of the portions of said executable code read out to said processor are equal or less than the number of operations that said processor can handle as an instruction.

10. Apparatus for increasing the efficiency of a VLIW processor having functional units for the parallel processing of VLIW instructions embedded in compiled executable code, comprising:

means for establishing the level of parallelism of said processor;

means for establishing the level of parallelism of said executable code; and, means when the level of parallelism of said processor exceeds that of said executable code for inactivating that number of said functional units which brings the level of parallelism of said processor to match that of said executable code.

11. Apparatus for increasing the efficiency of a VLIW processor having functional units for the parallel processing of VLIW instructions embedded in compiled executable code, comprising:

means for establishing the level of parallelism of said processor;

means for establishing the level of parallelism of said executable code; and, means when the level of parallelism of said processor is less than that of said executable code for sequentially reading out portions of said executable code processable by the existing functional units of said processor whereby the level of parallelism of said processor and said executable code are matched.

* * * * *